United States Patent
Hall et al.

(10) Patent No.: US 8,756,371 B2
(45) Date of Patent: Jun. 17, 2014

(54) METHODS AND APPARATUS FOR IMPROVED RAID PARITY COMPUTATION IN A STORAGE CONTROLLER

(75) Inventors: Randy K. Hall, Boulder, CO (US);
Dennis E. Gates, Wichita, KS (US);
Randolph W Sterns, Arvada, CO (US);
John R. Kloeppner, Buhler, KS (US);
Mohamad H. El-Batal, Boulder, CO (US)

(73) Assignee: LSI Corporation, Milpitas, CA (US)

( * ) Notice: Subject to any disclaimer, the term of this patent is extended or adjusted under 35 U.S.C. 154(b) by 421 days.

(21) Appl. No.: 13/271,397

(22) Filed: Oct. 12, 2011

(65) Prior Publication Data
US 2013/0097376 A1  Apr. 18, 2013

(51) Int. Cl.
G06F 12/16 (2006.01)
G06F 11/10 (2006.01)
G06F 11/20 (2006.01)
G06F 12/12 (2006.01)
G06F 3/06 (2006.01)

(52) U.S. Cl.
CPC ........ *G06F 11/1076* (2013.01); *G06F 11/2094* (2013.01); *G06F 12/123* (2013.01); *G06F 3/061* (2013.01); *G06F 3/0658* (2013.01); *G06F 3/0689* (2013.01)
USPC .................................. 711/114; 711/E12.103

(58) Field of Classification Search
None
See application file for complete search history.

(56) References Cited

U.S. PATENT DOCUMENTS

| | | |
|---|---|---|
| 5,634,033 A | 5/1997 | Stewart et al. |
| 5,883,909 A | 3/1999 | DeKoning et al. |
| 5,937,174 A | 8/1999 | Weber |
| 6,065,096 A | 5/2000 | Day et al. |
| 6,145,017 A | 11/2000 | Ghaffari |
| 6,151,641 A | 11/2000 | Herbert |
| 6,385,683 B1 | 5/2002 | DeKoning et al. |
| 6,820,171 B1 | 11/2004 | Weber et al. |
| 6,912,687 B1 | 6/2005 | Gates et al. |
| 7,743,191 B1 | 6/2010 | Liao |
| 2002/0199048 A1 | 12/2002 | Rabinovitz |
| 2006/0041783 A1 | 2/2006 | Rabinovitz |
| 2006/0143506 A1 | 6/2006 | Whitt et al. |
| 2007/0143541 A1 | 6/2007 | Nichols et al. |
| 2008/0130219 A1 | 6/2008 | Rabinovitz |
| 2010/0251073 A1 | 9/2010 | Stolowitz |

*Primary Examiner* — Kevin Verbrugge
(74) *Attorney, Agent, or Firm* — Duft Bornsen & Fettig LLP; Gregory T. Fettig (57) ABSTRACT

Methods and apparatus for improved calculation of redundancy information in RAID storage controllers. Features and aspects hereof provide for a firmware/software element (FPE) for generating redundancy information in combination with a custom logic circuit (HPE) designed to generate redundancy information. A scheduler element operable on a processor of a storage controller along with the FPE determines which of the FPE and HPE is best suited to rapidly complete a new redundancy computation operation and activates or queues the new operation for performance by the selected component.

17 Claims, 4 Drawing Sheets

METHODS AND APPARATUS FOR IMPROVED RAID PARITY COMPUTATION IN A STORAGE CONTROLLER

BACKGROUND

1. Field of the Invention

The invention relates generally to storage systems and more specifically relates to methods and structure for improved performance in computing parity in a RAID storage controller by using both hardware parity computation assist circuitry and programmed instructions for parity computation.

2. Discussion of Related Art

In RAID (Redundant Array of Independent Disks) storage systems, logical volumes are defined and managed. A logical volume comprises portions of two or more disk drives and stores redundancy information along with user data provided by attached host systems. The redundancy information is generated and stored in conjunction with stored data such that failure of a single disk drive (or two disk drives in some embodiments) does not preclude ongoing access to the data on the logical volume. Rather, the logical volume may continue operation until such time as the failed drive is replaced and the full redundancy features are restored (a "hot swap" operation and a "rebuild" operation).

Various "levels" of RAID storage management are standardized in the storage industry. In RAID level 5, user data and redundancy information is distributed ("striped") over a plurality of storage devices (at least 3 devices). In RAID level 5, the redundancy information is the exclusive-OR ("XOR") sum of the user data. Thus, a "stripe" of data in RAID level 5 management includes a plurality of blocks of user data and a corresponding parity block that is the XOR sum of the user data in the related blocks of the stripe. In like manner, RAID level 6 defines a stripe of data as a plurality of blocks of user data and two blocks of redundancy information—typically a first parity block that is the XOR sum or the other blocks and a second block that may be also XOR parity, Galois field accumulation (also referred to as Galois field multiplication or "GFM"), or other redundancy computations. RAID level 6 can therefore keep a logical volume operating even in the event of two disk drive failures of the logical volume.

Computation of the redundancy block (or blocks) can impose a notable computational load on a general purpose processor of the storage controller. For this reason, a number of present storage controllers replace the software ("firmware") computation of a redundancy block (or blocks) with a special purpose circuit designed to assist the general purpose processor by off-loading the redundancy computations to a specially designed circuit for such computation. However, even such special purpose processors can become overloaded in a high performance storage system and/or may be less efficient for certain types of data or certain patterns of user data access.

Thus it is an ongoing challenge to efficiently compute redundancy information used in RAID storage systems and in particular in RAID levels 5 and 6 storage management.

SUMMARY

The present invention solves the above and other problems, thereby advancing the state of the useful arts, by providing methods and apparatus for combining a firmware/software element ("firmware parity engine" or "FPE") for generating redundancy information with a custom logic circuit ("hardware parity engine" or "HPE") designed to generate redundancy information. A scheduler element operable on a processor of a storage controller along with the FPE determines which of the FPE and HPE is best suited to rapidly complete a new redundancy computation operation. The scheduler then activates an idle component (FPE or HPE) to process the new operation or queues the new operation for eventual processing of the new operation.

In one aspect hereof, a storage controller is provided comprising a programmable processor programmed to process I/O requests from attached systems and a firmware redundancy computation element operable on the programmable processor of the storage controller. The firmware redundancy computation element is operable to generate redundancy information from data applied to the firmware redundancy computation element. The controller further comprises a redundancy computation circuit coupled with the programmable processor and operable to generate redundancy information from data applied to the redundancy computation circuit. The controller also comprises a scheduler element operable on the programmable processor. The scheduler element is operable to selectively utilize either the firmware redundancy computation element or the redundancy computation circuit for generating redundancy information in the storage controller based on present operating conditions of the storage controller. The redundancy information is used by the controller in processing RAID storage management relating to the I/O requests.

Another aspect hereof provides a method and an associated computer readable medium embodying the method. The method is operable in a Redundant Array of Independent Disks (RAID) storage controller for generating redundancy information. The storage controller has a firmware redundancy computation element operable on a programmable processor of the controller. The storage controller also has a redundancy computation circuit coupled with the programmable processor. The method comprises generating a request to perform a redundancy computation operation based on identified data. The request comprises information identifying the computation to be performed. The method also comprises selecting a selected redundancy computation component from either the firmware redundancy computation element or the redundancy computation circuit to perform the redundancy computation operation based on present operating status of the storage controller and performing the redundancy computation operation using the selected redundancy computation component to generate redundancy information. The method then uses the generated redundancy information for RAID storage management functions of the storage controller.

DETAILED DESCRIPTION OF THE DRAWINGS

Figure 1:
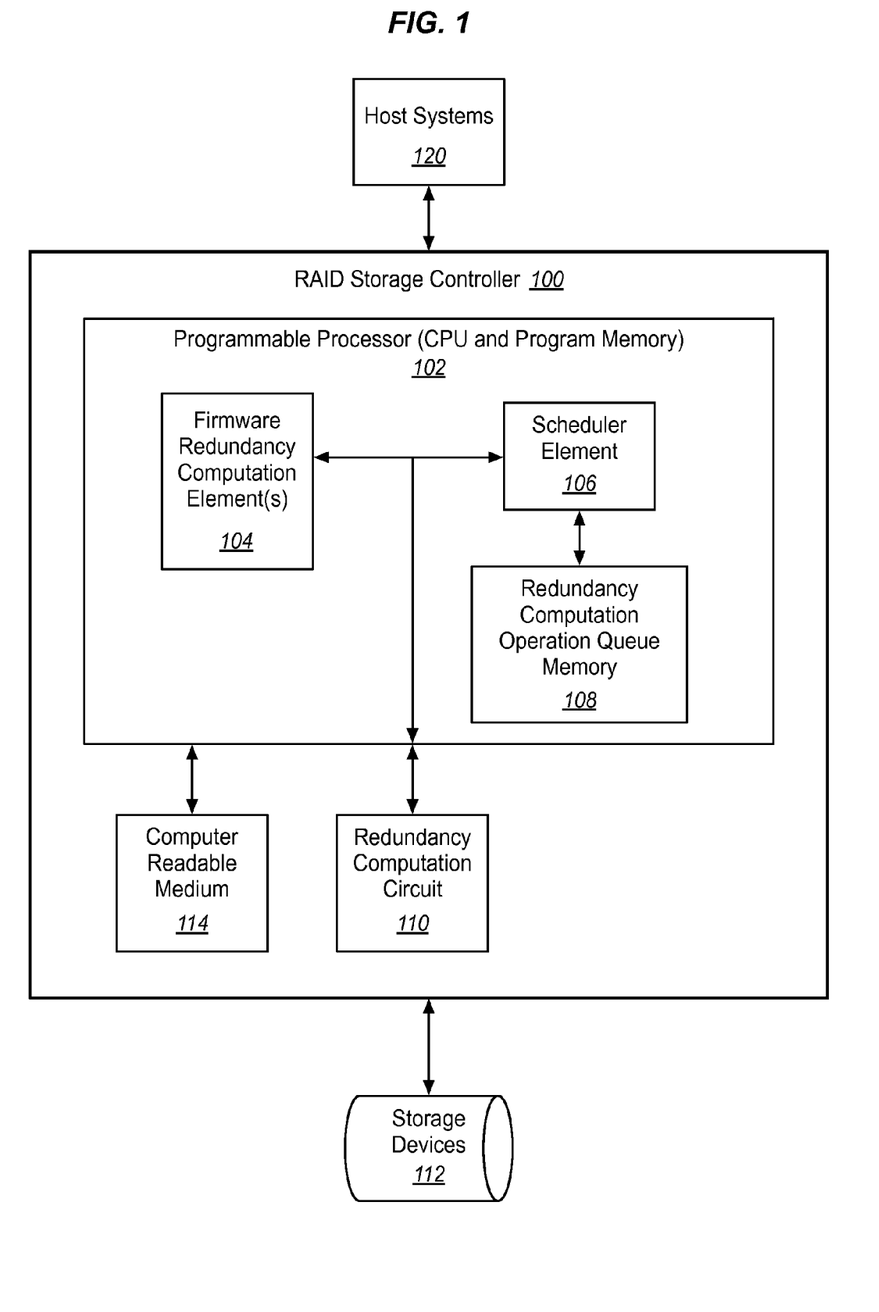
FIG. 1 is a block diagram of an exemplary storage controller enhanced in accordance with features and aspects hereof to improve computation of redundancy information in RAID storage management.

FIG. 1 is a block diagram of an exemplary RAID storage controller 100 enhanced in accordance with features and aspects hereof to provide improved performance in computation of redundancy information for RAID storage management. Controller 100 is adapted to receive I/O requests from one or more coupled host systems 120. Controller 100 may be coupled with host systems 120 through any of several well-known commercially available communication protocols and media including, for example, Ethernet, Serial Attached SCSI (SAS), Serial Advanced Technology Attachment (SATA), Fibre Channel (FC), etc. Controller 100 is also adapted to couple with one or more storage devices 112 for persistently storing and retrieving user supplied data. Controller 100 may be coupled with storage devices 112 using any of several well-known commercially available communication media and protocols including, for example, SAS, SATA, FC, etc. Storage devices 112 may comprise magnetic storage media, optical storage media, solid-state disk, etc.

Controller 100 further comprises programmable processor 102 (including suitable program memory for storing programmed instructions). Processor 102 may be any suitable general or special purpose processor adapted to retrieve and execute programmed instructions stored in its associated program memory. The program memory may comprise any suitable memory device including, for example, dynamic random access memory (DRAM), various types of programmable read only memory (PROM), flash memory, etc.

Controller 100 is enhanced in accordance with features and aspects hereof in that it comprises one or more firmware redundancy computation elements 104 and one or more redundancy computation circuits 110. Firmware redundancy computation elements 104 comprise programmed instructions stored in the program memory associated with processor 102. Redundancy computation circuits 110 comprise custom electronic logic circuits. Both firmware redundancy computation elements 104 and redundancy computation circuits 110 are designed to generate redundancy information from data applied thereto. As is well-known to those of ordinary skill in the art, RAID storage management utilizes various forms of redundancy information to enhance reliability including, for example, XOR parity and Galois field multiplication information. In the context of RAID level 5 storage management, XOR parity is used while in RAID level 6 storage management, XOR parity and Galois field multiplication information is used for redundancy information associated with applied user data.

As noted above, in general, circuits 110 may compute redundancy information faster than a software/firmware implementation such as firmware redundancy computation elements 104. However, as noted above, situations arise where it may be useful to enhance overall performance of RAID storage controller 100 by providing both firmware and hardware redundancy computation elements. Thus, controller 100 is further enhanced to comprise scheduler element 106 implemented as programmed instructions in the program memory associated with processor 102. Scheduler element 106 determines whether a requested redundancy computation operation can be more quickly performed by redundancy computation circuits 110 or by firmware redundancy computation elements 104. Scheduler element 106 may utilize redundancy computation operation queue memory 108 for queuing computation operations to be performed by firmware redundancy computation elements 104 or by redundancy computations circuit 110. Scheduler element 106 determines which elements can best perform a particular computation operation based on present operating conditions of controller 100.

Queue memory 108 may comprise a portion of the program memory associated with processor 102 or may comprise a separate memory element coupled with or otherwise associated with processor 102. As a separate memory element, queue memory 108 may be any suitable memory including, for example, RAM or other suitable read/write memory components.

In some embodiments, controller 100 further comprises computer readable medium 114 adapted to store programs instructions to be utilized in program memory associated with processor 102. Computer readable medium 114 may be any suitable storage medium for storing such programs instructions including, for example, semiconductor memory devices, magnetic or optical storage devices, or any other suitable medium for storing non-transitory signals representing programmed instructions to be executed by process 102. In some embodiments, computer readable medium 114 may further serve as the program memory associated with processor 102 or may comprise a separate memory component from which program instructions may be copied into program memory associated with processor 102. Further, though depicted as integral with controller 100, computer readable medium 114 may also comprise suitable storage media external to controller 100 and coupled with controller 100 through any suitable communication media and protocol.

In some embodiments, firmware redundancy computation elements 104 (hereinafter also referred to as "FPE") may comprise a plurality of redundancy computation methods implemented utilizing various instruction capabilities of processor 102. FPE 104 may comprise redundancy computation methods using, for example, different single instruction multiple data (SIMD) instruction sets provided in processors from Intel Corporation. The Intel MMX and SSE modes using Intel instructions may be employed in one exemplary embodiment as well as the SSE mode with non-temporal cache operation (referred to herein as "SSENT"). FPE 104 comprises computer programmed algorithms to accumulate one or more of RAID level 5 XOR parity and RAID level 6 Galois field multiplication (GFM) information with XOR parity. In this exemplary embodiment, each parity type has functions programmed in FPE 104 for the each of the various SIMD modes. Each of the modes of operation of the FPE and operations on the HPE may be best suited for particular data alignment characteristics as well as preferred block size of data to be transferred and manipulated. For example, GFM with SSE uses 16-byte alignment and accumulates 32 bytes at a time. If the data size is not an even multiple of 32 bytes, a slower method may be preferred that accumulates only 16 bytes at a time. Or an even slower MMX method that accumulates only 8 bytes at a time supporting 8-byte alignment may be used. Another, faster, MMX method accumulates 64-bytes (one processor cache line) at a time. In practice, if any data buffer is not 16-byte aligned or is not a multiple of 64 bytes for XOR and 32 bytes for GFM, a default slower MMX1 mode accumulating 8 bytes at a time may be preferred. Also, the HPE may have its own alignment preferences or requirements. Some parity jobs may not be capable of being processed by the HPE alone but rather may use of the FPE or a combination of FPE and HPE computations to do different parts of the same parity job calculation. Thus, scheduler element 106 may select from the multiple redundancy computation methods based, at least in part, on the alignment characteristics of the data to be applied to the redundancy computation operation.

In some exemplary embodiments, the redundancy computations circuits 110 (hereinafter also referred to as "HPE") and FPE 104 utilize an identical interface to receive information identifying a redundancy computation operation from scheduler element 106. Thus, scheduler element 106 may be simplified in that preparation for a redundancy computation operation may be identical regardless of whether an FPE computation is selected or an HPE computation is selected.

Both the HPE and the FPE may follow a client-server API model where "parity jobs" are requested by a client task, with an expectation of an asynchronous callback from the parity engine server (HPE or FPE) when a job completes. A "parity job" comprises the specification of a redundancy computation operation, including RAID parameters and a list of Chain Descriptor (CD) structures that define the scatter/gather lists for the source and destination buffers. Though the phrase "parity job" may suggest only XOR parity computation, as used herein, the phrase refers to either XOR parity or GFM computations (or any other desired computation for redundancy information to be generated) for RAID storage management. The FPE is designed to emulate the HPE in that it interprets and processes the same CD lists. This allows use of common code in scheduler element 106 to manage most of the "parity job" processing and to schedule jobs on the appropriate engine.

In general, scheduler element 106 may implement a plurality of queues in redundancy computation operation queue memory 108. A first queue may be used for storing information regarding operations to be presently performed by HPE 110. A second queue may be used for storing information regarding operations to be presently performed by FPE 104. Other exemplary embodiment may provide additional queues for operations awaiting performance by either the HPE or FPE. The particular number of queues to be utilized by scheduler element 106 within memory 108 is a matter of design choice well-known to those of ordinary skill in the art.

In operation, scheduler element 106 may select between FPE and HPE for a given redundancy computation operation based on numerous factors associated with present operation of controller 100. For example, the FPE may be much faster for processing some redundancy computation operations depending on factors such as RAID depth (size of each block of data) and width (number of blocks of data involved in the redundancy computation), size and alignment of the data to be applied to the computation, and current computational load on processor 102. Likewise, the HPE may be faster for some load profiles, especially for intermittent light loads where the firmware task activation delay (time required to commence operations of the FPE) becomes significant.

Still further, in some embodiments, processor 102 may comprise a multicore processor having a plurality of processor cores each operable substantially in parallel with other processor cores. In such multicore embodiments, FPE 104 may operate on one or more of the plurality of processor cores dedicated only to functioning of FPE 104. Where multiple cores are utilized by FTE 104, redundancy computation operations may be performed substantially in parallel by multiple instances of FPE 104 elements each operable on one of these multiple dedicated cores. In other exemplary embodiments, one or more of such multiple processor cores may be dynamically assigned for operation of one or more instances of FPE 104 elements. In like manner, HPE 110 may be implemented to provide multiple computation engines within a single redundancy computation circuit 110 or multiple such circuits 110. Such multiple engines may be configured to operate in parallel on a single redundancy computation or may be configured to operate independently, each performing an assigned redundancy computation operation.

Where multiple instances of FPE 104 are implemented, scheduler element 106 may provide a corresponding number of queues in queue memory 108 (one or more queues associated with each instance of an FPE 104 element). In like manner, where HPE 104 implements multiple computation engines, scheduler element 106 may provide a corresponding number of queues in queue memory 108 (one or more queues associated with each engine of HPE 110).

In some embodiments, it may be helpful to manage all resources used by the FPE and the HPE in a common "pool" so that processing of a parity computation operations uses common processor data cache hits regardless of whether the HPE or the FPE is selected for processing.

Figure 2:
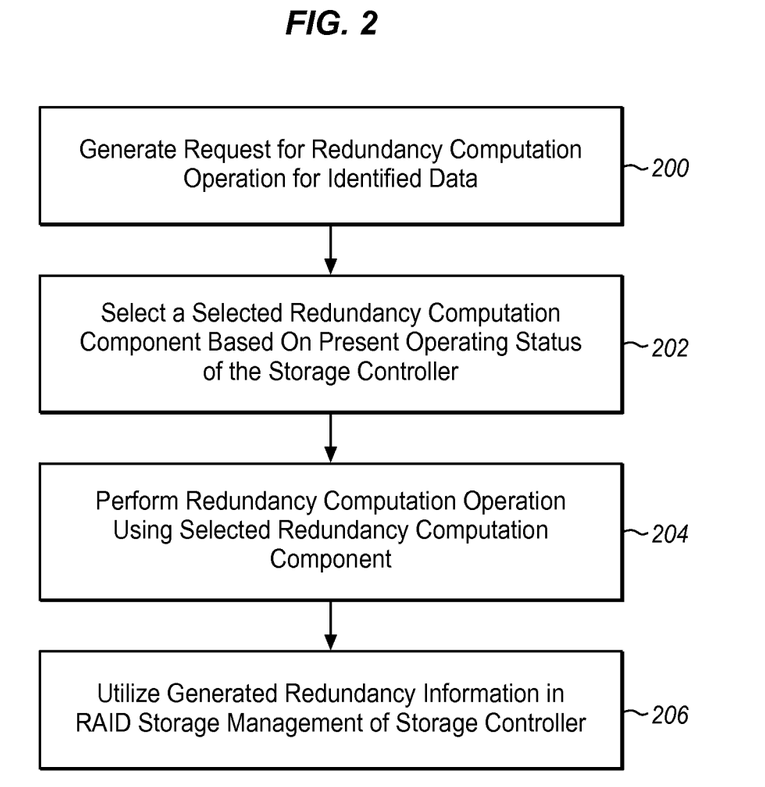
FIGS. 2 through 4 are flowcharts describing exemplary methods in accordance with features and aspects hereof to improve computation of redundancy information in RAID storage management by a RAID storage controller.

FIG. 2 is a flowchart describing an exemplary method in accordance with features and aspects hereof to improve performance of redundancy information generation in a RAID storage controller. The method of FIG. 2 may be performed in a storage controller such as storage controller 100 of FIG. 1. At step 200, the controller generates a request for a redundancy computation operation utilizing identified data (i.e., a "parity job" to be computed to generate redundancy information). The generation of such a request may arise within the storage controller from processing of a host system I/O request received within the controller or may arise from other RAID storage management operations performed by the RAID storage controller. The redundancy computation operation request generally identifies the data to be applied to the RAID computation operation and identifies the type of redundancy information to be generated (e.g., XOR parity and/or GFM redundancy information).

At step 202, a scheduler element of the storage controller selects a selected redundancy computation component based on the present operating status of the storage controller. More specifically, the scheduler element selects between an FPE process and an HPE process to perform the generated redundancy computation operation. The scheduling algorithm can be adjusted to favor running jobs on any one or more of the available engines (FPEs or HPEs) depending on current loads on all and the overall load on the processor of the storage controller. In one exemplary embodiment, the scheduler selects an HPE when available and selects an FPE to supplement the HPE when the load on the HPE starts to saturate. The scheduler may determine the HPE load first (e.g., as a number of operations presently active and/or awaiting processing as measured by the number of entries in the queues associated with the HPEs). If at least one of the HPE elements is not presently busy, the scheduler assigns the "parity job" to an idle HPE element. The HPE elements are generally fast in completing presently active parity job computations. Thus, it is likely that in-process parity jobs will complete with a hardware interrupt (generated by the HPE completed presently active computations) before one of the FPE elements can be activated to start a next parity job. Therefore, parity jobs may be queued for operation by the HPE if the load determination indicates that the HPE may complete the job before an FPE element could do so. The scheduler element at step 202 may determine the load on the HPE elements by detecting the number of queued jobs awaiting performance by the HPE elements. For example, if all HPE elements are presently running corresponding jobs and one or more jobs are queued waiting for the HPEs, then the scheduler may activate an idle FPE instance to run the newly generated redundancy computation operation. In this example, if the HPEs are all busy but nothing is queued waiting for an idle HPE element, then the scheduler may assign the newly generated parity job to a wait queue for an HPE element anticipating a completion interrupt before an FPE element can be activated. Thus, the load for processing parity jobs can be balanced among the different engines (HPEs and FPEs) by assessing the depth of the various queues for each and using the least busy engine for a given job. Numerous other scheduling algorithms will be apparent to those of ordinary skill in the art and some exemplary additional details are provided herein below.

At step 204, the selected redundancy computation component performs the newly generated redundant redundancy computation operation. Step 204 represents the eventual performance of the generated redundancy computation operation as queues of presently active and awaiting parity jobs are processed by the various redundancy computation components. The processor may be interrupted by the completed processing of the operation (e.g., interrupted by the HPE or FPE element that completed the operation). The interrupt allows the processor to then utilize the generated redundancy information and to resume scheduler processing to activate any waiting operations in the various queues. At step 206, the generated redundancy information resulting from the performed redundancy computation operation is utilized for RAID storage management purposes by the RAID storage controller. Utilization of such generated redundancy information for RAID storage management purposes is well known to those of ordinary skill in the art and may comprise, for example, generation of redundancy information for purposes of writing new user data to the storage devices as well as for rebuilding missing data responsive to failure of the storage device.

Figure 3:
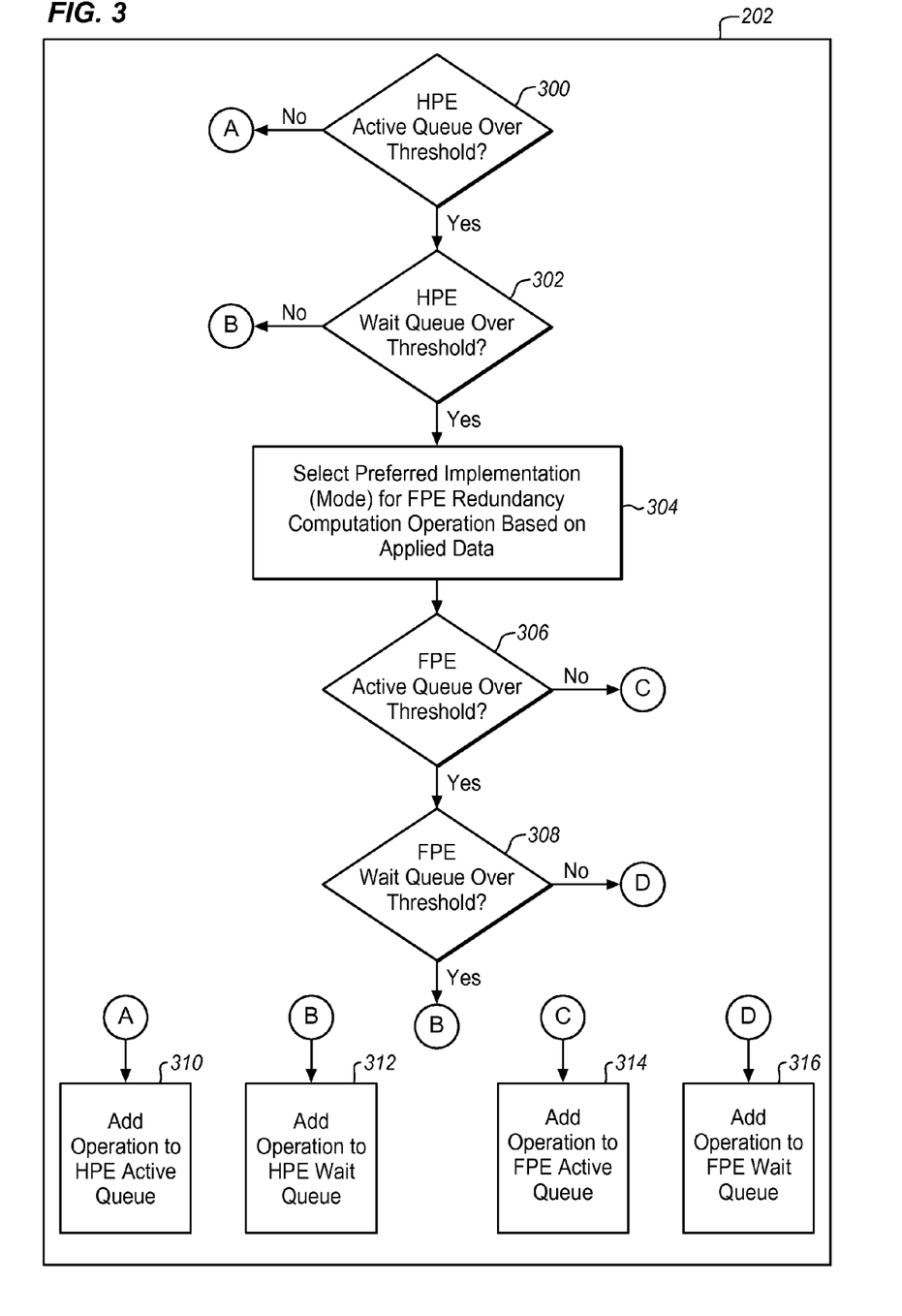

FIG. 3 is a flowchart providing exemplary additional details of operation of step 202 of FIG. 2. Step 202 is generally operable to select a redundancy computation component from among the various FPE and HPE elements to perform a newly generated redundancy computation operation. In the exemplary method of FIG. 3, each HPE element and each FPE element is associated with an active queue for operations that are presently active in the corresponding element and with a wait queue for operations presently awaiting use of the corresponding element. At step 300, the scheduler element determines whether the number of entries in the active queue for each HPE element has exceeded a predetermined threshold value. If not, processing continues at step 310 to add the newly generated redundancy computation operation to an idle HPE element's active queue thus activating one or more HPE elements to perform the parity job processing. If active queue for each HPE element has more entries than a predetermined threshold value, processing continues at step 302 to determine if the wait queue for each HPE element has a number of entries exceeding a predetermined threshold value. If not, processing continues at step 312 to add the newly generated redundancy computation operation to an HPE element's wait queue.

If the number of entries in all HPE element wait queues has exceeded a predetermined threshold, step 304 is next operable to select a preferred firmware mode of calculation based on the applied data to be utilized in the redundancy information computation. As noted above, a variety of firmware implementation modes may be embodied within the FPE elements, each tuned to a particular alignment of data or other characteristics of the data to be applied to the redundancy computation operation. Thus, step 304 selects an appropriate mode for an FPE computation based on alignment of data or other characteristics of the data to be applied. Next, step 306 determines whether the FPE active queue for each FPE element has exceeded a predetermined threshold number of entries. If not, step 314 adds the newly generated redundancy computation operation to the active queue for an idle FPE element thus activating an FPE component on one or more processor cores of the controller's processor. If step 306 determines that all FPE active queues have exceeded a threshold number of queued operations, step 308 next determines whether all FPE element wait queues have exceeded a predetermined threshold value number of entries. If not, step 316 is next operable to add the newly generated redundancy computation operation to an FPE wait queue for an identified FPE element. Otherwise, if all queues have exceeded their respective predetermined threshold number of entries, step 312 is next operable to add the newly generated redundancy computation operation to the HPE wait queue having the fewest entries. This default action reflects a presumption that the HPE elements will likely be able to complete their operations before the excessive number of FPE presently active and queued operations can complete.

In some exemplary embodiments, the threshold number of entries in each queue may be tuned as desired for a particular application. In one exemplary embodiment, the preferred predetermined threshold value is one. In other words, if all HPE elements are presently active on one or more redundancy computation operations then some HPE element wait queue may be used to the store the newly generated operation. If all HPE element wait queues have at least one operation presently queued, then the operation may be added to an FPE element's active queue unless each such FPE active queue also has at least one operation presently active. If all HPE queues and all FPE active queues all have at least one operation queued, the newly generated operation may be added to an FPE element's wait queue unless each such FPE wait queue also already has at least one operation queued. In the default case where all queues have exceeded the preferred single entry threshold, the operation is added to the shortest HPE wait queue in expectation that the HPE will complete its operations before all FPE queued operations can complete.

Figure 4:
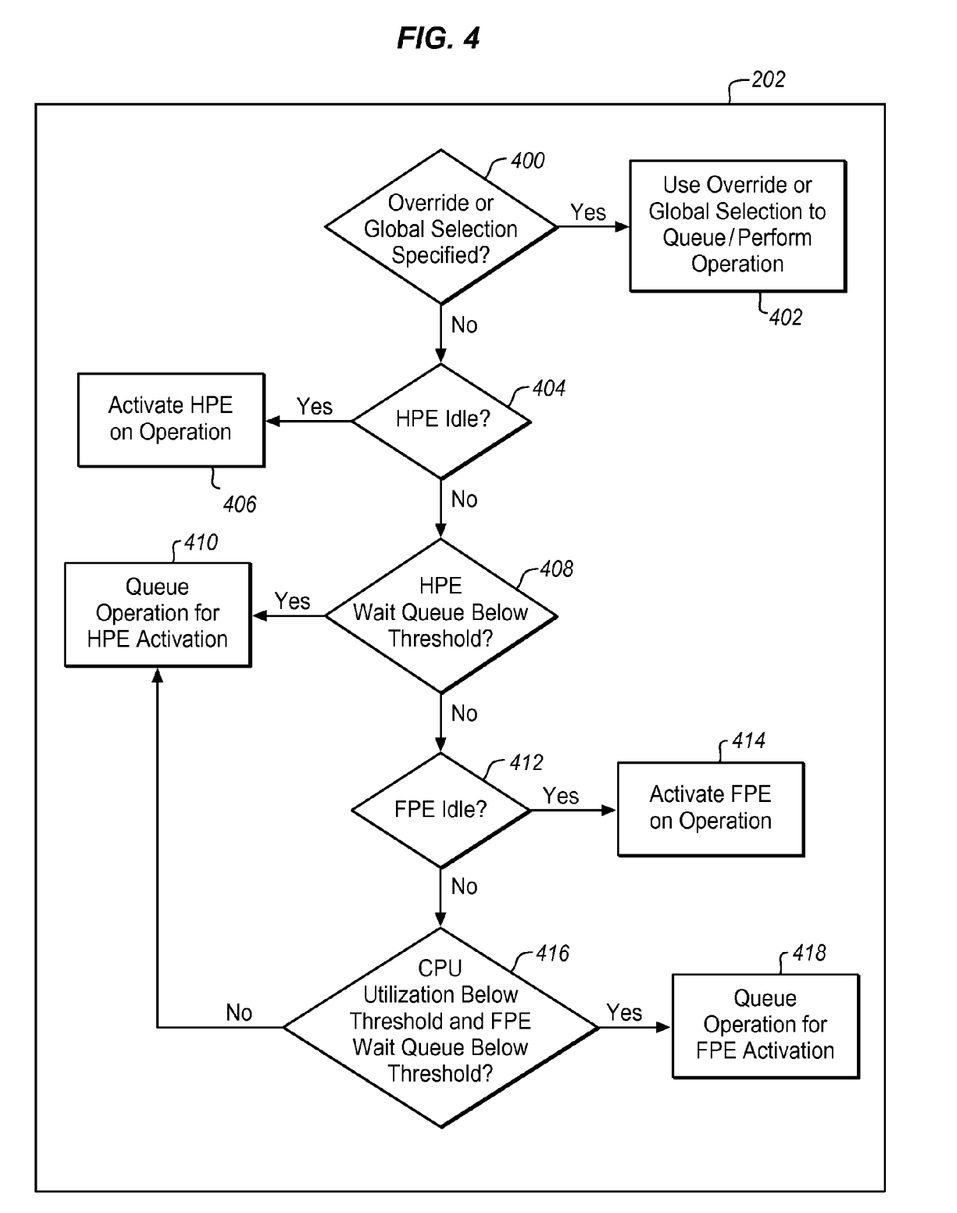

FIG. 4 is a flowchart describing another exemplary detailed embodiment of step 202 of FIG. 2 describing operation of the scheduler element of the storage controller. In the exemplary embodiment of FIG. 4, the scheduler element may include configurable per-job override or global selections for the preferred activation of a redundancy computation component. Such a per-job override or global selection configuration may be used to, in essence, disable the dynamic selection of a redundancy computation component in favor of a predetermined, fixed selection. At step 400, the controller determines whether a per-job override or global selection has been specified in the configuration of the storage controller. If so, step 402 uses the redundancy computation component identified by the global or override selection criteria. Thus, the operation is simply added to the active queue for the selected computation component based on the override or global selection configuration. If no such global or override selection is specified in the present configuration of the storage controller, step 404 determines whether some HPE element is presently idle. If so, step 406 activates an idle HPE element on the newly generated redundancy computation operation. If not, step 408 determines whether any HPE element's wait queue presently has a number of entries below a predetermined threshold value. If so, step 410 adds the newly generated redundancy computation operation to an HPE element's wait queue to await subsequent HPE activation. If the number of entries in all HPE elements' wait queues exceeds a predetermined threshold value, step 412 is next operable to determine whether any FPE element is presently idle. If so, step 414 activates an idle FPE element to perform the newly generated redundancy computation operation. Otherwise, step 416 evaluates the present processor utilization of the storage controller to determine whether the overall processor utilization is below a predetermined threshold value. Further, step 416 determines whether the number of entries in any FPE element's wait queue is below a predetermined threshold value. If the overall CPU loop utilization is below the predetermined threshold value and the wait queue for some FPE element has a number of entries less than a predetermined threshold value, step 418 adds the newly generated redundancy computation operation to the wait queue for an FPE element to await subsequent activation of an FPE element. Otherwise, step 410 adds the newly generated redundancy computation operation to the shortest wait queue for all HPE elements to await subsequent activation of the HPE element to perform the redundancy computation operation.

In general, the scheduler element as detailed in the exemplary methods of FIGS. 3 and 4 inspects appropriate queues upon receipt of an interrupt indicating completion of a presently active redundancy computation operation. When an HPE element interrupts the scheduler element to indicate completion of a presently active HPE redundancy computation operation, the scheduler element determines if another operation is presently queued in the HPE element's active queue or in the HPE element's wait queue. If such a next operation is identified, the HPE element is re-activated to perform the next queued operation. In like manner, when a presently active FPE redundancy computation operation indicates completion of an operation (e.g., by use of a "callback" function invocation or a software generated interrupt), the scheduler element inspects the FPE active queue and the FPE wait queue for the interrupting FPE element to identify a next queued operation. If such a next queued operation is located, the interrupting FPE element is re-activated to commence a new redundancy computation operation.

In some embodiments, when the scheduler element receives indication of completion of a presently active HPE computation (e.g., an interrupt of the processor indicating completion) and no further HPE queue entries are located, the scheduler element may inspect the FPE queues and move a presently queued redundancy computation operation from an FPE queue to the HPE active queue. More generally, if any HPE or FPE element has completed an operation and other operations remained queued for any other HPE or FPE, the scheduler element may shift operations from one queue to another to help maintain continued calculation of redundancy computation operations.

Those of ordinary skill in the art will readily recognize numerous additional and equivalent steps that may be present in fully functional methods exemplified by the methods of FIGS. 2 through 4. Such additional and equivalent steps are omitted herein for simplicity and brevity of this discussion. In like manner, those of ordinary skill in the art will readily recognize numerous additional components in a fully functional storage controller such as storage controller 100 of FIG. 1. Such additional and equivalent components are omitted here in for simplicity and brevity of this discussion.

Operation of an exemplary scheduler element may also be understood by those of ordinary skill in the art with reference to the following pseudo-code that exemplifies an embodiment of the scheduling logic and algorithms.

---

Definitions:
    fpe - firmware parity engine
    hpe - hardware parity engine
    job - a unit of work representing a RAID stripe
    mode - MMX1 (single accumulator), MMX, SSE, SSENT (SSE with non-temporal data cache)
    global - default operation
    width - number of source buffers
    table - predetermined optimal mode for width

---

-continued

Priority is implied by the order of checking.
    if job override is hpe
        use hpe
    else if job override is fpe
        use fpe
        if job mode is specified
            use mode
        else
            choose mode
    else job override is not specified
        if global is hpe
            use hpe
        else if global is fpe
            use fpe
            if global mode is specified
                use mode
            else
                choose mode
        else global is not specified
            choose engine
            if engine is fpe
                choose mode
            else
                use hpe
choose engine:
    if hpe is idle
        use hpe
    else if hpe wait queue is below watermark
        use hpe
    else if fpe is idle
        use fpe
    else if cpu utilization is below watermark
        if fpe wait queue is below watermark
            use fpe
        else
            use hpe
choose mode:
    if any buffer isn't a multiple of 64 bytes
        use MMX1
    else if any buffer is 8-byte aligned
        use MMX
    else if table available
        use table[width].mode == MMX, SSE, SSENT
    else
        use SSENT

---

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A Redundant Array of Independent Disks (RAID) storage controller comprising:
    a programmable processor programmed to process I/O requests from attached systems;
    a firmware redundancy computation element operable on the programmable processor of the storage controller, the firmware redundancy computation element operable to generate redundancy information from data applied to the firmware redundancy computation element;
    a redundancy computation circuit coupled with the programmable processor and operable to generate redundancy information from data applied to the redundancy computation circuit; and a scheduler element operable on the programmable processor, the scheduler element operable to selectively utilize either the firmware redundancy computation element or the redundancy computation circuit for generating redundancy information in the storage controller based on present operating conditions of the storage controller, wherein the redundancy information is used by the controller in processing RAID storage management relating to the I/O requests.

2. The controller of claim 1
wherein the firmware redundancy computation element further comprises implementation of a plurality of redundancy computation methods, and
wherein the scheduler element is further operable to select one of the plurality of implementations of redundancy computation methods based on an alignment characteristic of the data applied to the firmware redundancy computation element.

3. The controller of claim 2
wherein each of the plurality of firmware redundancy computation methods uses a corresponding set of single instruction multiple data (SIMD) instructions.

4. The controller of claim 1 further comprising:
a memory coupled with the scheduler element and coupled with the firmware redundancy computation element and coupled with the redundancy computation circuit, the memory adapted to store a firmware queue identifying redundancy computation operations to be performed by the firmware redundancy computation element and further adapted to store a hardware queue identifying redundancy computation operations to be performed by the redundancy computation circuit,
wherein the firmware redundancy computation element is operable to generate redundancy information by performing a redundancy computation operation identified in the firmware queue,
wherein the redundancy computation circuit is operable to generate redundancy information by performing a redundancy computation operation identified in the hardware queue,
wherein the scheduler element is further operable to select the redundancy computation circuit by adding information identifying a redundancy computation in the hardware queue, and
wherein the scheduler element is further operable to select the firmware redundancy computation element by adding information identifying a redundancy computation in the firmware queue.

5. The controller of claim 4
wherein the scheduler element is further operable to determine a number of redundancy computation operations in the hardware queue,
wherein the scheduler element is further operable to add information identifying a new redundancy computation operation to the hardware queue in response a determination that the number of redundancy computation operations in the hardware queue is less than or equal to a predetermined threshold value, and
wherein the scheduler element is further operable to add information identifying the new redundancy computation operation to the firmware queue in response to a determination that the number of redundancy computation operations in the hardware queue is greater than the predetermined threshold value.

6. The controller of claim 5
wherein the predetermined threshold value is 1.

7. The controller of claim 1
wherein the programmable processor is a multi-core processor having a plurality of cores.

8. The controller of claim 7
wherein the firmware redundancy computation element is a multi-threaded element operable to use multiple of the plurality of cores to perform one or more redundancy computation operations in parallel.

9. The controller of claim 7
wherein the firmware redundancy computation element is operable on one or more dedicated cores of the plurality of cores.

10. A method operable in a Redundant Array of Independent Disks (RAID) storage controller for generating redundancy information, the storage controller having a firmware redundancy computation element operable on a programmable processor of the controller and the storage controller having a redundancy computation circuit coupled with the programmable processor, the method comprising:
generating a request to perform a redundancy computation operation based on identified data, the request comprising information identifying the computation to be performed;
selecting a selected redundancy computation component from either the firmware redundancy computation element or the redundancy computation circuit to perform the redundancy computation operation based on present operating status of the storage controller;
performing the redundancy computation operation using the selected redundancy computation component to generate redundancy information; and
using the generated redundancy information for RAID storage management functions of the storage controller.

11. The method of claim 10
wherein the storage controller has a memory adapted to store a firmware queue and a hardware queue,
wherein the step of selecting further comprises adding information identifying the redundancy computation operation to the hardware queue in response to selecting the redundancy computation circuit as the selected redundancy computation component, and
wherein the step of selecting further comprises adding information identifying the redundancy computation operation to the firmware queue in response to selecting the firmware redundancy computation element as the selected redundancy computation component.

12. The method of claim 11
wherein the step of selecting further comprises:
determining a number of redundancy computation operations in the hardware queue;
adding information identifying the redundancy computation operation to the hardware queue in response a determination that the number of redundancy computation operations in the hardware queue is less than or equal to a predetermined threshold value; and
adding information identifying the redundancy computation operation to the firmware queue in response to a determination that the number of redundancy computation operations in the hardware queue is greater than the predetermined threshold value.

13. The method of claim 12
wherein the predetermined threshold value is 1.

14. A non-transitory computer readable medium tangibly embodying programmed instructions which, when executed by a processor of a Redundant Array of Independent Disks (RAID) storage controller, perform a method for generating redundancy information, the storage controller having a firmware redundancy computation element operable on a programmable processor of the controller and the storage controller having a redundancy computation circuit coupled with the programmable processor, the method comprising:

generating a request to perform a redundancy computation operation based on identified data, the request comprising information identifying the computation to be performed;

selecting a selected redundancy computation component from either the firmware redundancy computation element or the redundancy computation circuit to perform the redundancy computation operation based on present operating status of the storage controller;

performing the redundancy computation operation using the selected redundancy computation component to generate redundancy information; and using the generated redundancy information for RAID storage management functions of the storage controller.

15. The medium of claim 14
wherein the storage controller has a memory adapted to store a firmware queue and a hardware queue,
wherein the method step of selecting further comprises adding information identifying the redundancy computation operation to the hardware queue in response to selecting the redundancy computation circuit as the selected redundancy computation component, and
wherein the method step of selecting further comprises adding information identifying the redundancy computation operation to the firmware queue in response to selecting the firmware redundancy computation element as the selected redundancy computation component.

16. The medium of claim 15
wherein the method step of selecting further comprises:
determining a number of redundancy computation operations in the hardware queue;
adding information identifying the redundancy computation operation to the hardware queue in response a determination that the number of redundancy computation operations in the hardware queue is less than or equal to a predetermined threshold value; and
adding information identifying the redundancy computation operation to the firmware queue in response to a determination that the number of redundancy computation operations in the hardware queue is greater than the predetermined threshold value.

17. The medium of claim 16
wherein the predetermined threshold value is 1.

* * * * *